United States Patent
Fuchs et al.

(10) Patent No.: US 8,670,899 B2
(45) Date of Patent: Mar. 11, 2014

(54) METHOD FOR THE SENSOR DETECTION OF AN OPERATOR CONTROL EVENT

(75) Inventors: Thorsten Fuchs, Hallstadt (DE); Detlef Russ, Ebersdorf (DE); Matthias Hering, Forchheim (DE); Holger Wuerstlein, Zeil am Main (DE); Danilo Mueller, Velden (DE); Florian Pohl, Ehersdorf (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 13/378,322

(22) PCT Filed: Mar. 11, 2011

(86) PCT No.: PCT/EP2011/001203
§ 371 (c)(1),
(2), (4) Date: Feb. 15, 2012

(87) PCT Pub. No.: WO2011/113552
PCT Pub. Date: Sep. 22, 2011

(65) Prior Publication Data
US 2013/0131917 A1  May 23, 2013

(30) Foreign Application Priority Data
Mar. 17, 2010 (DE) .......... 10 2010 011 767

(51) Int. Cl.
*G06F 7/00* (2006.01)
(52) U.S. Cl.
USPC .......... 701/36; 701/29.7; 701/29.8; 701/30.9; 701/33.6; 340/933
(58) Field of Classification Search
USPC ........ 701/29.1, 29.7, 30.9, 29.8, 33.6, 36, 66; 340/905, 933
See application file for complete search history.

(56) References Cited

U.S. PATENT DOCUMENTS

| 5,416,711 A * | 5/1995 | Gran et al. .................... 701/117 |
| 2006/0092278 A1 | 5/2006 | Kondo et al. |

FOREIGN PATENT DOCUMENTS

| DE | 10106400 | 8/2002 |
| DE | 102004027541 | 12/2004 |
| DE | 10333894 | 2/2005 |
| DE | 102004041709 | 10/2005 |
| DE | 102005032402 | 9/2006 |

(Continued)

OTHER PUBLICATIONS

Bishop, Christopher M., "Pattern Recognition and Machine Learning," Springer, Berlin 2006, 375 pages.

*Primary Examiner* — Gertrude Arthur Jeanglaude
(74) *Attorney, Agent, or Firm* — Pauly, Devries, Smith & Deffner, L.L.C.

(57) ABSTRACT

A method for detection of a control event by a sensor arrangement having at least one sensor element and a sensor controller is described. The sensor controller digitizes sensor signals into sensor measured values. An operator control event is produced by a user and a first coarse evaluation for a sign of operator control is performed and a predetermined number of sensor measured values are progressively buffer-stored in a buffer store wherein detection of a sign of operator control initiates a fine evaluation of the sensor measured values to verify the occurrence of an operator control event at an initiation time. The fine evaluation is based on the buffer-stored sensor measured values and on subsequent sensor measured values, so that the fine evaluation includes sensor measured values both before and after the initiation time.

19 Claims, 3 Drawing Sheets

(56) References Cited

FOREIGN PATENT DOCUMENTS

| DE | 102006005327 | 8/2007 |
|---|---|---|
| DE | 202005020140 | 10/2007 |
| DE | 102006037237 | 2/2008 |
| DE | 102009017404 | 11/2009 |
| DE | 102009025212 | 4/2010 |
| DE | 102008063366 | 7/2010 |
| EP | 1902912 | 3/2008 |
| FR | 2920172 | 2/2009 |
| WO | 2011113552 | 9/2011 |

* cited by examiner

METHOD FOR THE SENSOR DETECTION OF AN OPERATOR CONTROL EVENT

CROSS-REFERENCE TO RELATED APPLICATIONS

This application is a national stage application under 35 U.S.C. 371 of International Patent Application Serial No. PCT/EP2011/001203, entitled "METHOD FOR SENSOR DETECTION OF AN OPERATOR CONTROL EVENT," filed Mar. 11, 2011, which claims priority from German Patent Application No. 10 2010 011 767.6, filed Mar. 17, 2010, the disclosures of which are incorporated herein by reference.

FIELD OF THE INVENTION

The invention relates to a method for the sensor detection of an operator control event and to a motor vehicle having an electrical system for carrying out the methods.

BACKGROUND OF THE INVENTION

The electrical systems in today's motor vehicles are equipped with a multiplicity of electrical loads, a substantial portion of which are used for implementing added-convenience functions. The power consumption of such vehicle electrical systems may be considerable even in stationary mode, depending on the load, which in the worst case can result in complete discharge of the vehicle battery. Of particular importance in this context, besides the power consumption of the individual electrical loads, is the power consumption of the bus system in the vehicle electrical system. This is because today's bus systems are usually designed such that waking up a load entails waking up the entire system, which significantly increases power consumption.

One of the above added-convenience functions is what is known as the "keyless entry function". A common feature of known keyless entry systems is that there is provision for an, in particular radio-based, authentication dialog between a motor-vehicle-end keyless entry control unit and a user-end radio key or the like in order to check the access authorization of the user. Following a successful authentication dialog and possibly further operator control events, the motor vehicle is unlocked and/or, depending on the design, possibly a hatch or the like is operated by a motor.

A known arrangement having a keyless entry function (DE 103 33 894 A1) provides for the keyless entry control unit to continuously or cyclically test whether a radio key is present for the authentication dialog. Since this is associated with accordingly continuous or cyclic discharge of the vehicle battery, it is proposed that an additional energy store be provided for the keyless entry function.

In order to reduce the power consumption of the electrical system in a motor vehicle, it has also been proposed that at least part of the control unit be intermittently transferred to a power-saving standby mode and be woken into an operating mode according to the situation (DE 10 2004 027 541 A1). A challenge for this method is the correct switching between the standby mode and the operating mode, namely such that the respectively desired function is not impaired nor is there any susceptibility to external influences or misuse.

A known arrangement having a keyless entry function (DE 20 2005 020 140 U1) is equipped with a sensor arrangement which has an associated sensor element in the form of a proximity sensor. Waking the keyless entry control unit and possibly opening a hatch or the like by motor are initiated in this case by an operator control event which is performed by the user of the motor vehicle. The operator control event may be the user approaching the motor vehicle, a foot movement or the like. This method is the basis for the present invention.

SUMMARY OF THE INVENTION

In view of the above-addressed importance of low power consumption in motor vehicles, it is naturally important that the sensor arrangement also operates on an energy-efficient basis. In this case, it is firstly necessary to ensure that operator control events which occur are detected with certainty and that there is no erroneous detection of operator control events which are not present per se. This is because the erroneous detection of an operator control event results in unwanted waking of the keyless entry control unit and hence of the entire bus system, which is associated with considerable expenditure of energy.

The above requirements of high detection certainty, on the one hand, and of low power consumption, on the other hand, are inconsistent with one another and present a challenge when interpreting the method in question.

The invention is based on the problem of designing and developing the known method such that a particularly high level of detection certainty for an operator control event, on the one hand, and particularly low power consumption in stationary mode, on the other hand, are ensured.

The above problem is solved in the case of a method for detection of an operator control event by a sensor arrangement having at least one sensor element, which is particularly in the form of a proximity sensor, and a sensor controller, wherein the sensor controller digitizes the sensor signals into sensor measured values, wherein the operator control event is produced by a user, particularly of a motor vehicle by performing a first coarse evaluation of the sensor measured values for occurrence of a sign of operator control, wherein a predetermined number of the respective last sensor measured values from at least one sensor element is progressively buffer-stored in a buffer store, and detection of a sign of operator control initiates a fine evaluation of the sensor measured values for the purpose of verifying the occurrence of an operator control event at an initiation time. The fine evaluation is based on the buffer-stored sensor measured values and on the chronologically subsequent sensor measured values, so that the fine evaluation includes sensor measured values situated both before and after the initiation time.

Of significance first of all is the fundamental consideration that the detection of an operator control event is divided into coarse evaluation with a low power consumption and fine evaluation with a correspondingly higher power consumption. On the basis of the result of the coarse evaluation, the fine evaluation is initiated or else not initiated.

The coarse evaluation involves the sensor measured values being checked for the occurrence of a sign of operator control. By way of example, such a sign of operator control is a first approach by the user to the motor vehicle and can be implemented by a threshold value check at low computation power.

The fine evaluation amounts to evaluation of the time profile of those respective sensor measured values, for example, and requires accordingly higher computation power. At this point, it is also not necessary to save computation power, since the fine evaluation is, of course, performed only if the coarse evaluation has detected a sign of operator control as above, that is to say that there is already a certain probability that an operator control event is actually occurring.

As a result, the coarse evaluation can be used to detect signs of operator control, which are verified as an operator control event by the fine detection. Hence, the coarse evaluation, and not the fine evaluation, operates over the majority of the life of the arrangement, so that a favorable energy footprint is obtained overall.

The solution according to the proposal comprises a further aspect which guarantees a particularly high level of detection certainty for the fine evaluation. This is because, according to the proposal, the sensor controller progressively buffer-stores a predetermined number of the respective last sensor measured values from at least one sensor element and makes these buffer-stored sensor measured values available to the fine evaluation.

If the fine evaluation is thus initiated at a particular initiation time then not only are the sensor measured values ascertained from the initiation time onward available for the fine evaluation, but also sensor measured values situated before the initiation time. The sensor measured values situated before the initiation time are not lost during the fine evaluation.

The solution according to the proposal allows a particularly high level of detection certainty to be guaranteed for low power consumption in stationary mode. This is particularly clear when the method according to the proposal is used in an electrical system in a motor vehicle.

This is because experiments have shown that the erroneous waking of parts of the vehicle electrical system, particularly the bus system, is quite considerable in comparison with standard idling power consumption. The reduction in misinitiations, which can be achieved not least by the reliable fine evaluation, shows the advantage of using the method according to the proposal in an electrical system in a motor vehicle.

In the preferred refinement, the operator control event to be detected is a foot movement by the user, and, in one embodiment, it is a to and fro movement by the foot of the user. Naturally, any other operator control events, particularly different user gestures or the like, are conceivable in this case.

In order to increase detection certainty particularly for the fine evaluation, other embodiments provide for the sensor measured values from at least one sensor element to be subjected to evaluation in the manner of pattern recognition.

The underlying concept for pattern recognition is that possibly prefiltered sensor measured values are first of all subjected to feature extraction. The features to be extracted can be selected such that they are "separation effective". This means that the features need to be suitable for distinguishing the "with an operator control event" state from the "without an operator control event" state (Christopher M. Bishop: *Pattern Recognition and Machine Learning*. Springer, Berlin 2006, ISBN 0-387-31073-8).

The feature reduction is followed by the performance of classification in which the embodiment of the extracted features is allocated to particular classes of patterns that are to be detected, in this case situations.

The literature discloses a series of what are known as "classifiers" which can advantageously also be used in the present area. Merely by way of example, the classifiers "window", "Euclidian distance", "nearest neighbor", "family of characteristic curves", "fuzzy logic" and "neural networks" may be cited.

On the basis of further teaching, which can likewise be attributed separate significance, a motor vehicle having an electrical system for carrying out the methods according to the proposal is disclosed. In order to explain this further teaching, reference can be made to all embodiments relating to the methods according to the proposal.

In one embodiment, the invention provides a method for detection of an operator control event by a sensor arrangement having at least one sensor element, which is particularly in the form of a proximity sensor, and a sensor controller, wherein the sensor controller digitizes the sensor signals into sensor measured values and the operator control event is produced by a user, particularly of a motor vehicle. A first coarse evaluation of sensor measured values for occurrence of a sign of operator control is performed. A predetermined number of the respective last sensor measured values from at least one sensor element is progressively buffer-stored in a buffer store. Detection of a sign of operator control initiates a fine evaluation of the sensor measured values to verify occurrence of an operator control event at an initiation time. The fine evaluation is based on buffer-stored sensor measured values and on chronologically subsequent sensor measured values so that the fine evaluation includes sensor measured values situated both before and after the initiation time.

In one embodiment, an electrical system for a motor vehicle is provided, wherein at least parts of the vehicle electrical system can be woken from a power-saving standby mode into an operating mode, wherein the vehicle electrical system has a control unit, particularly in the form of a keyless entry control unit, and wherein following successful verification at least part of the remainder of the vehicle electrical power supply system, particularly the control unit and/or a bus system which may be present, is/are woken by the sensor controller into the operating mode.

In one embodiment, the waking of the control unit initiates an, in particular radio-based, authentication dialog with a radio key of the user, and, preferably, wherein following a successful authentication dialog and possibly following the detection of a further operator control event by the sensor arrangement, a hatch, particularly a rear hatch, on the motor vehicle is opened by motor.

In one embodiment, the sampling rate for the digitization is essentially identical for the coarse evaluation and for the fine evaluation, or the sampling rate for ascertaining the sensor measured values from the sensors signals is lower for the coarse evaluation than for the fine evaluation.

In one embodiment, the sign of operator control is defined as a first approach by the user to the sensor arrangement, which is detected in the coarse evaluation by means of a threshold value being exceeded by the sensor measured values or a critical slope for the time profile of the sensor measured values from at least one sensor element being exceeded.

In one embodiment, the operator control event is defined as a predetermined user movement which is detected in the fine evaluation by means of the time profile of the sensor measured values.

In one embodiment, the operator control event is defined as a foot movement by the user and the sensor arrangement has at least two sensor elements, in the form of proximity sensors, which are arranged in or on a rear fairing portion, particularly the rear bumper, of a motor vehicle and which preferably extend over an essential portion of the width of the motor vehicle, wherein the detection range of one sensor element also points rearward at any rate and wherein the detection range of the other sensor element also points downward at any rate.

In one embodiment, the operator control event defined is a to and fro movement by the foot of the user and wherein during the operator control event both sensor elements produce a pulsed time profile for the sensor measured values sensor pulse.

In one embodiment, the profile of the sensor measured values from at least one sensor element which is typical of the operator control event has an associated series of features which are first of all extracted from the sensor measured values and are then classified, in the manner of pattern recognition, for the purpose of coarse evaluation and/or for the purpose of fine evaluation. In one embodiment, the features are defined as the width and/or as the height and/or as the edge gradient and/or as the curvature of portions of the sensor pulses and/or as a time offset between two sensor pulses from a sensor element. In one embodiment, the features are defined as a time offset between the sensor pulses from two sensor elements and/or as a predetermined correlation, particularly as a cross-correlation, for the sensor signals from two sensor elements relative to one another.

A motor vehicle having an electrical system for carrying out the methods described above is also provided.

BRIEF DESCRIPTION OF THE FIGURES

The invention is explained in more detail below with reference to a drawing which shows merely one exemplary embodiment and in which.

DETAILED DESCRIPTION

The method according to the proposal for the sensor detection of an operator control event is subsequently explained with reference to an operator control event, wherein the operator control event is produced by a user of a motor vehicle. However, the method according to the proposal can be used for all conceivable areas in which the sensor detection of operator control events is involved.

According to the proposal, the sensor detection of the operator control event is effected by means of a sensor arrangement 1 which has at least one associated sensor element 2, 3, which is in this case and preferably in the form of a proximity sensor, and an associated sensor controller 4. The exemplary embodiment presented here is a sensor arrangement 1 having two sensor elements 2, 3, as will be explained below.

Numerous variants are conceivable for the definition of the operator control event to be detected. In this case and preferably, the operator control event is a foot movement by the user of the motor vehicle, as will be explained.

Figure 3:
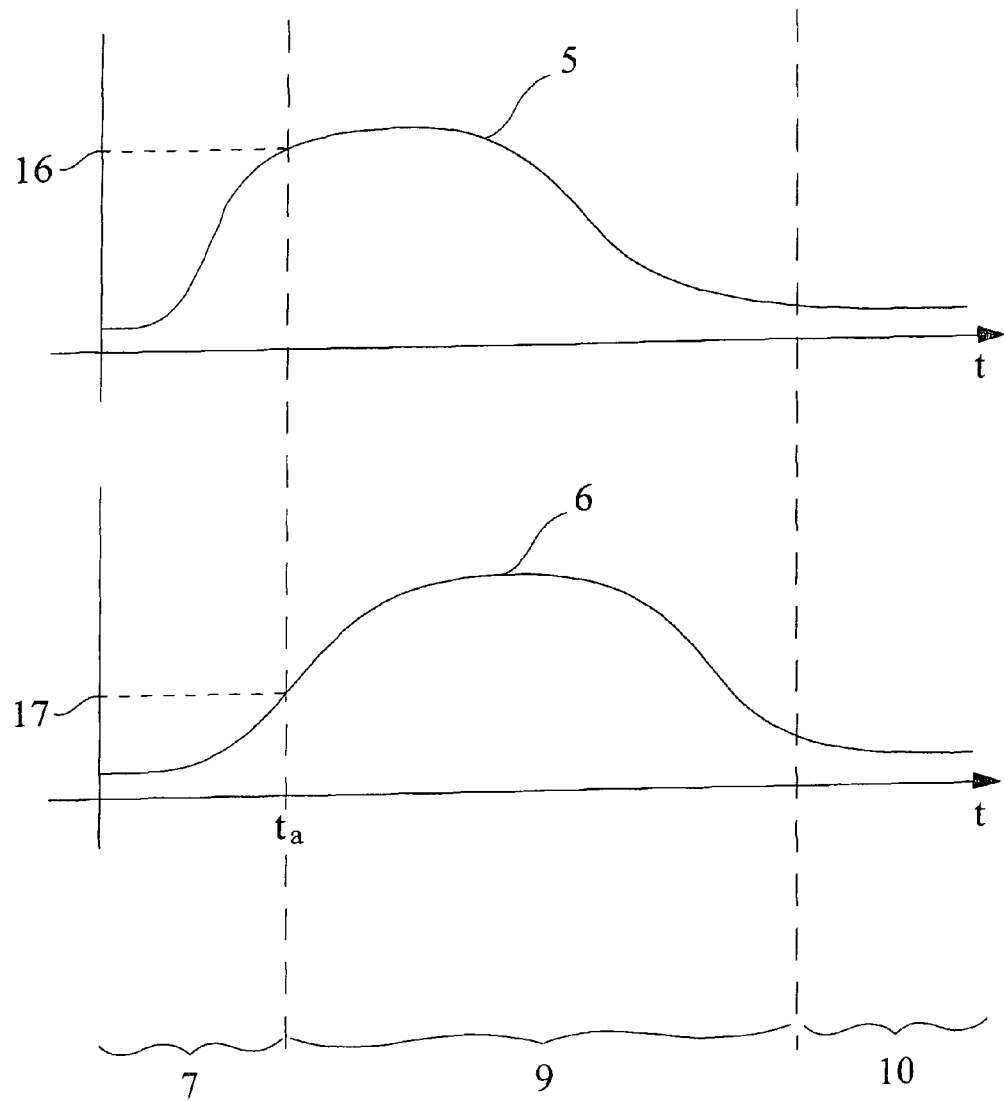
FIG. 3 shows two exemplary signal profiles for the two sensor elements shown in FIG. 1 during an operator control event.

The sensor signals 5, 6 produced by the two sensor elements 2, 3 are shown in FIG. 3. In this case, the top of FIG. 3 shows the sensor signal 5 from the sensor element 2 at the top in FIG. 1, and the bottom of FIG. 3 shows the sensor signal 6 from the sensor element 3 at the bottom in FIG. 1.

The above sensor signals 5, 6 are digitized in standard fashion at a sampling rate in an A/D converter. From the continuous sensor signals 5, 6, discrete sensor measured values 5a, 6a are thus ascertained which are shown merely schematically in FIG. 2.

Figure 2:
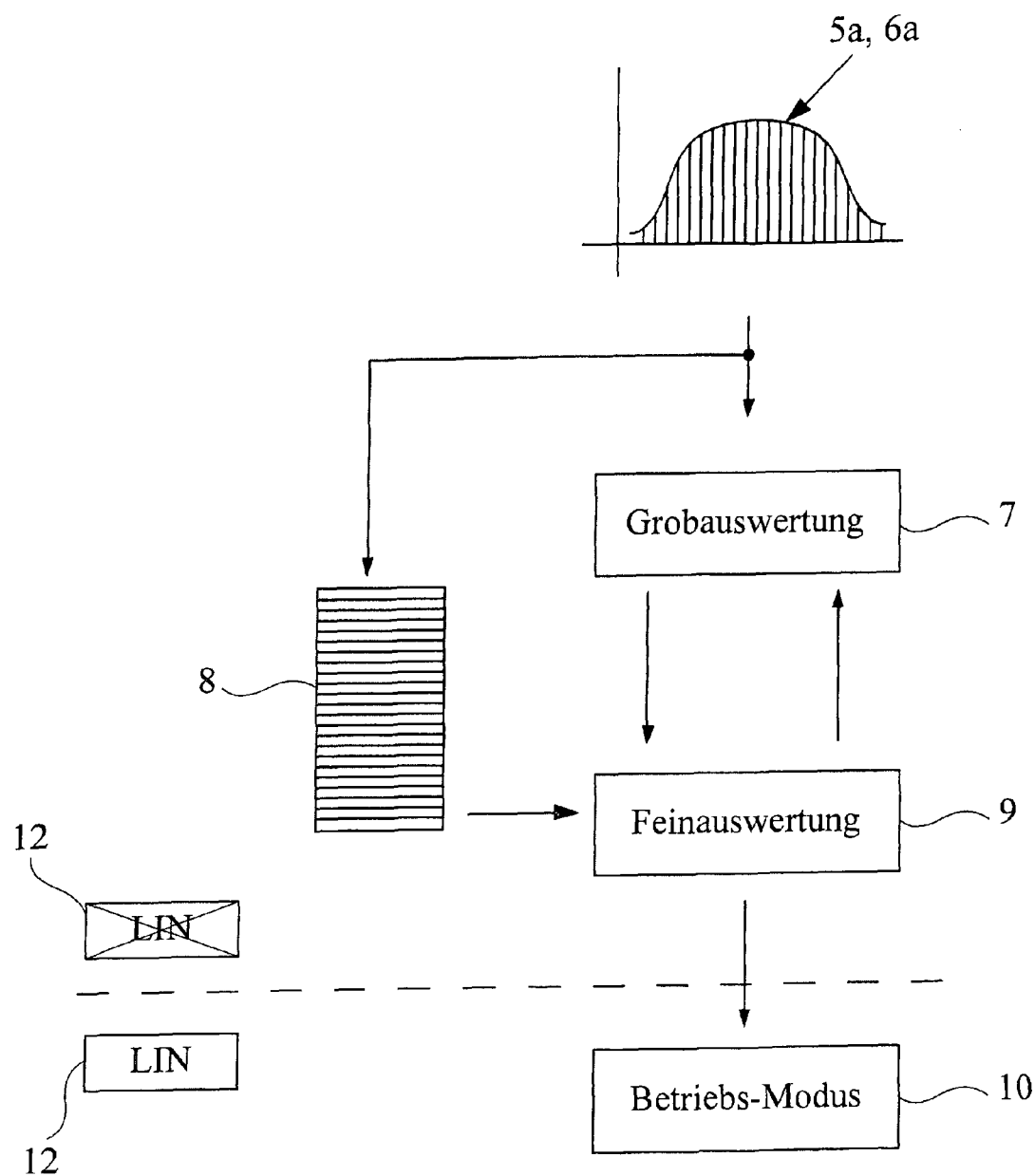
FIG. 2 shows a flowchart for the first cited method according to the proposal in an entirely schematic illustration.

The illustration shown in FIG. 2 reveals that the sensor measured values 5a, 6a are supplied to a first coarse evaluation 7. During the coarse evaluation 7, the sensor measured values 5a, 6a are checked for the occurrence of a sign of operator control. It has already been pointed out that the occurrence of a sign of operator control involves a certain degree of probability of there actually being the operator control event that actually needs to be detected. By way of example, the sign of operator control may be a certain rise in the sensor measured values 5a, 6a from at least one of the sensor elements 2, 3, as will be explained.

The illustration in FIG. 2 likewise reveals that the sensor measured values 5a, 6a are in this case stored progressively in an FIFO (first in, first out) buffer store 8. This is nothing other than progressive buffer-storage of a predetermined number of the respective last sensor measured values 5a, 6a from at least one sensor element 2, 3.

The number of buffer-stored sensor measured values 5a, 6a preferably corresponds to approximately the number of measured values which are needed in the coarse evaluation for detecting the sign of operator control.

The detection of a sign of operator control initiates fine evaluation 9 of the sensor measured values 5a, 6a for the purpose of verifying the occurrence of an operator control event at a certain initiation time $t_A$.

An essential feature is now the fact that the fine evaluation 9 is based on the buffer-stored sensor measured values 5a, 6a and on the chronologically subsequent sensor measured values 5a, 6a, so that the fine evaluation 9 includes sensor measured values 5a, 6a situated both before and after the initiation time $t_A$.

The latter aspect is best shown in the illustration shown in FIG. 3. In this case, the fine evaluation 9 comprises the sensor measured values 5a, 6a for the sensor signals 5, 6 both to the left of the initiation time $t_A$ and to the right of the initiation time $t_A$.

In order to ensure that the fine evaluation 8 also has available the sensor measured values 5a, 6a which are situated to the right of the initiation time $t_A$ in FIG. 3, the buffer store 8 continues to have the sensor measured values 5a, 6a progressively written to it, preferably even after the initiation of the fine evaluation 9.

If it is not possible to detect an operator control event in the fine evaluation 9, fine evaluation 9 is terminated and the coarse evaluation 7 continues to be performed as above. This is shown in FIG. 2 by the upwardly pointing arrow between the fine evaluation 9 and the coarse evaluation 7. In principle, it is also conceivable for the coarse evaluation 7 to be always running, that is to say also at the same time as the fine evaluation 9. This may be advantageous in the case of repeated operation.

Both the coarse evaluation 7 and the fine evaluation 9 are preferably performed in the sensor controller 4. In particular, both evaluations 7, 9 run on one and the same piece of hardware, particularly on one and the same microcontroller. The buffer store 8 is also preferably accommodated in the sensor controller 4.

In the case of the illustrated and in this respect preferred exemplary embodiment, the method according to the proposal is applied to a motor vehicle having an electrical system, wherein at least parts of the vehicle electrical system can be woken from a power-saving standby mode into an operating mode. In this case and preferably, the vehicle electrical system has a control unit 11, particularly in the form of a keyless entry control unit, wherein successful verification in the fine evaluation 9 is followed by at least part of the remainder of the vehicle electrical system, in this case at any rate the control unit 11 and the bus system 12 shown in FIG. 1, being woken into the operating mode 10 by the sensor controller 9. In principle, it is in this case also conceivable for the control unit 11, not the entire bus system 12, to be woken, namely when the control unit 11 is connected to the sensor controller 4 directly or only via a bus element.

At this juncture, it can be pointed out that all types of bus systems can be used for the bus system 12. A LIN bus system is indicated in FIG. 2 merely by way of example.

There are numerous conceivable options in the present case for implementing the control structure. By way of example, it is possible for the control unit 11 to be combined with the sensor controller 9 to form a controller with common hardware.

The above waking of the control unit 11 initiates an, in particular radio-based, authentication dialog with a radio key 13 belonging to the user, with, in this case and preferably following a successful authentication dialog, a hatch 14, in this case the rear hatch 14 of the motor vehicle, being opened by a motor. A hatch drive 15 is provided for this purpose. It is conceivable for the opening of the rear hatch 14 by motor to have to be preceded by the detection of a further operator control event by the sensor arrangement 1. This may be necessary, by way of example, in order to ensure that the user is outside the range of movement of the rear hatch 14 while the rear hatch 14 is being adjusted by motor.

Different variants may be advantageous for the design of the buffer store 8, depending on the application. In particular, a dedicated buffer store 8 may be provided for the sensor measured values 5a, 6a from each sensor element 2, 3. In the illustrated exemplary embodiment, only a single buffer store 8 is shown.

For the specific implementation of the buffer store 8, the use of an FIFO memory or of a ring memory is proposed. It is therefore possible to buffer-store just a predetermined number of sensor measured values 5a, 6a with low hardware complexity.

The illustration shown in FIG. 2 reveals the fact that the coarse evaluation 7 accesses the sensor measured values 5a, 6a directly rather than the buffer store 8. The reason is that the coarse evaluation 7 is meant to take place as quickly as possible in order to ensure an early initiation time $t_A$ and hence fast detection of the operator control event as a whole.

If the coarse evaluation 7 is intended to check the profile of the sensor measured values 5a, 6a, however, it may be advantageous for the coarse evaluation 7 to access the buffer store 8.

In principle, provision may be made for the sampling rate during digitization to be essentially identical for the coarse evaluation 7 and for the fine evaluation 9. This ensures that the sensor measured values 5a, 6a stored in the buffer store 8, which are used for the fine evaluation 9, of course, can be attributed to a correspondingly high sampling rate.

In order to keep down the power consumption for the coarse evaluation 7, provision may alternatively be made for the sampling rate to be lower for the coarse evaluation 7 and for the fine evaluation 9. In principle, it is also conceivable in this case for the sampling rate to be adjusted during the respective evaluation 7, 9 on the basis of the dynamics of the sensor signals 5, 6 that are to be expected.

According to the proposal, the coarse evaluation 7 and the fine evaluation 9 are designed such that the current draw and hence the power consumption is significantly lower for the coarse evaluation 7 than for the fine evaluation 9. Experiments have shown that a current draw of below 200 μA can be achieved for the coarse evaluation 7. For the fine evaluation 9, a current draw of less than 5 mA has been obtained using the method according to the proposal. In comparison, waking the bus system 12 together with the control unit 11 is associated with a current draw of intermittently up to 20 A.

In order to satisfy the above constraints in respect of low current draw, provision is preferably made for the sign of operator control to be defined merely as a first approach by the user to the sensor arrangement 1, which in the coarse evaluation 7 is detected by means of a threshold value 16, 17 being exceeded by the sensor measured values 5a, 6a or a critical slope for the time profile of the sensor measured values 5a, 6a being exceeded. In this case and preferably, both sensor elements 2, 3 have a respective associated threshold value 16, 17, with the sign of operator control being deemed to have been detected when both threshold values 16, 17 are exceeded. A glance at the illustration shown in FIG. 3 shows that there is some probability of an operator control event actually taking place when the two threshold values 16, 17 are exceeded.

The operator control event itself is in this case and preferably defined as a predetermined user movement which is detected in the fine evaluation 9 by means of the profile of the sensor measured values 5a, 6a. This can be implemented by testing particular critical values for the sensor measured values 5a, 6a or using pattern recognition, which is yet to be explained.

It can be pointed out that the fine evaluation 9 can, in principle, be followed by further fine evaluation or a plurality of further fine evaluations. It is also conceivable to continuously increase the computation complexity during the evaluation and hence the accuracy for the evaluation as the probability of detection increases.

Figure 1:
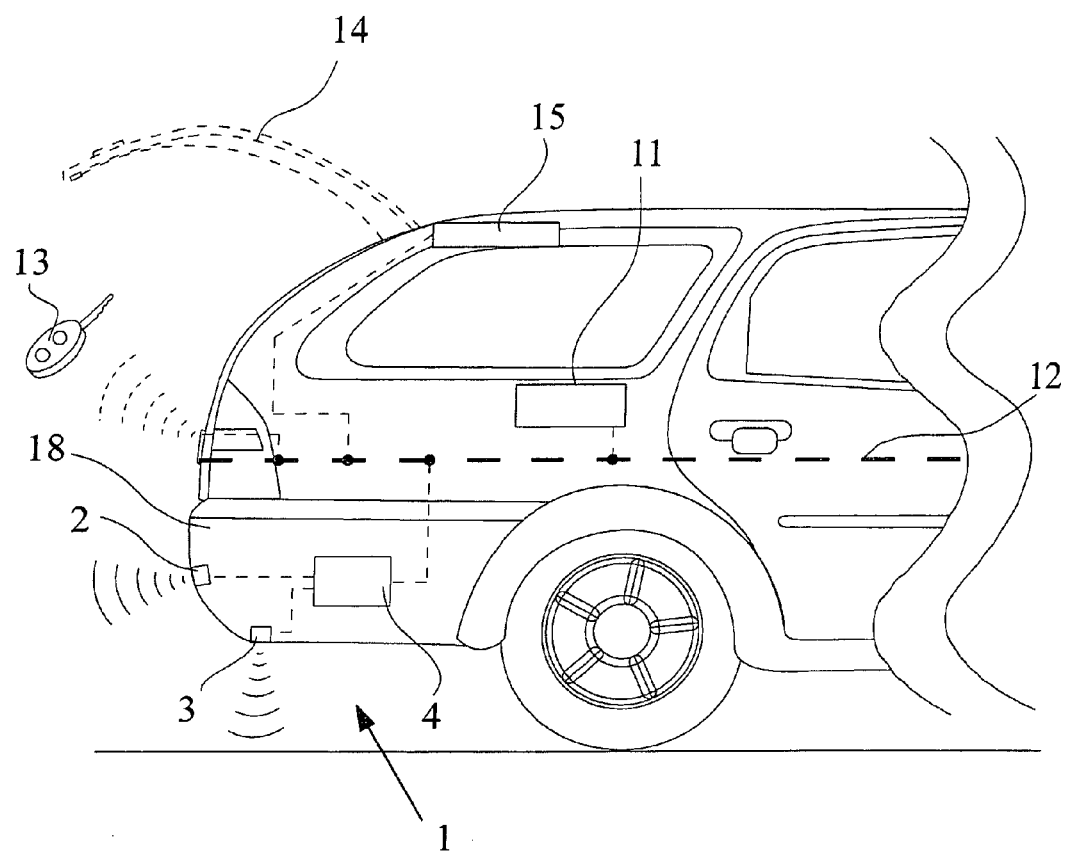
FIG. 1 shows the rear area of a motor vehicle according to the proposal for carrying out the methods according to the proposal.

In the present case, the operator control event is a foot movement by the user, as already mentioned, with the sensor arrangement 1 having at least two, in this case precisely two, sensor elements 2, 3 in the form of proximity sensors which, as shown in FIG. 1, are arranged in or on a rear fairing part 18, in this case and preferably the rear bumper 18, of the motor vehicle. In this case, the two sensor elements 2, 3 are capacitive proximity sensors having electrodes which each extend over an essential portion of the width of the motor vehicle. This ensures that it is accordingly possible to detect the operator control event over the majority of the width of the motor vehicle.

The illustration shown in FIG. 1 reveals that the schematically shown detection range of the upper sensor element 5 also points rearward at any rate and that the detection range of the lower sensor element 6 also points downward at any rate. This sensor arrangement 1 accordingly results in the sensor signal profiles 5, 6 shown in FIG. 3.

Preferably, the operator control event defined is the to and fro movement of the foot of the user, with both sensor elements 2, 3 producing a pulsed time profile for the sensor measured values 5a, 6a—which in this case is accordingly referred to as a "sensor pulse"—during the operator control event. This can also easily be seen from the illustration shown in FIG. 3.

Experiments have now shown that a user movement which is intended to be detected as an operator control event always has the quality of the signal profiles shown in FIG. 3. Naturally, any operator control and particularly operator control by different users manifests discrepancies in this case which must not result in an operator control event that is taking place not being recognized. The known methods of pattern recognition which have been addressed in the general part of the description can help in this context.

As the basis for the pattern recognition, a series of features are allocated to the profile—typical of the operator control event that is to be detected—of the sensor measured values 5a, 6a from at least one sensor element 2, 3. In the course of the pattern recognition, these features are first of all extracted from the sensor measured values 5a, 6a and are then classified. This is preferably done during the fine evaluation 9 and alternatively or additionally during the coarse evaluation 7.

The features to be extracted which can be defined are the width, the height, the edge gradient, the curvature of the sensor pulses, the time offset between two sensor pulses from a sensor element 5, 6 or the like. The classification involves these features then being checked for critical values or critical ranges.

Further conceivable features are the time offset between the sensor pulses from two sensor elements 2, 3 or a predetermined correlation, particularly the cross-correlation for the sensor signals 5, 6 from two sensor elements 2, 3 relative to one another. These features can also be classified using critical values and critical ranges such that, possibly together with the aforementioned features, it is possible to infer the occurrence or nonoccurrence of an operator control event.

Against the background of the similarity and time offset between the two sensor pulses produced by the operator control event of the user's foot moving to and fro, the ascertaining of the correlation, particularly the cross-correlation, has been found to be particularly efficient. For the classification, it is in this case particularly possible to check whether the location of the maximum of the correlation function is within predetermined boundaries associated with the operator control event.

According to further teaching, which can likewise be attributed separate significance, a motor vehicle having an electrical system is disclosed which is suitable for carrying out the methods according to the proposal. Reference can be made to all of the above comments suitable for explaining the motor vehicle.

The invention claimed is:

1. A method for the sensor detection of an operator control event by means of a sensor arrangement having at least one sensor element and a sensor controller, wherein the sensor controller digitizes sensor signals into sensor measured values, wherein the operator control event is produced by a user, wherein
   a first coarse evaluation of the sensor measured values for occurrence of a sign of operator control is performed, wherein a predetermined number of sensor measured values from at least one sensor element are progressively buffer-stored in a buffer store,
   detection of a sign of operator control initiates a fine evaluation of the sensor measured values to verify occurrence of an operator control event at an initiation time, and
   a fine evaluation is based on the buffer-stored sensor measured values and on chronologically subsequent sensor measured values, so that the fine evaluation includes sensor measured values situated both before and after the initiation time.

2. The method as claimed in claim 1, wherein an electrical system for a motor vehicle is provided, in which at least parts of the vehicle electrical system can be woken from a power-saving standby mode into an operating mode, wherein the vehicle electrical system has a control unit and, following successful verification, at least part of a remainder of the vehicle electrical power supply system, is woken by the sensor controller into the operating mode.

3. The method as claimed in claim 2, wherein the waking of the control unit initiates an authentication dialog with a radio key of the user, and following a successful authentication dialog, a hatch on the motor vehicle is opened by motor.

4. The method as claimed in claim 1, wherein a sampling rate for digitization is selected from a sampling rate that is essentially identical for the coarse evaluation and for the fine evaluation and a sampling rate for ascertaining the sensor measured values from the sensors signals that is lower for the coarse evaluation than for the fine evaluation.

5. The method as claimed in claim 1, wherein the sign of operator control is defined as a first approach by the user to the sensor arrangement, which is detected in the coarse evaluation by means of a threshold value being exceeded by the sensor measured values or a critical slope for the time profile of the sensor measured values from at least one sensor element being exceeded.

6. The method as claimed in claim 1, wherein the operator control event is defined as a predetermined user movement which is detected in the fine evaluation by means of the time profile of the sensor measured values.

7. The method as claimed in claim 5, wherein the operator control event is defined as a foot movement by the user and the sensor arrangement has at least two sensor elements, in the form of proximity sensors, which are arranged in or on a rear facing portion, of a motor vehicle and which extend over an essential portion of the motor vehicle width, wherein a detection range of one sensor element also points rearward at any rate and wherein a detection range of the other sensor element also points downward at any rate.

8. The method as claimed in claim 7, wherein the operator control event defined is a to and fro movement by a foot of the user and during the operator control event both sensor elements produce a pulsed time profile for the sensor measured values.

9. The method as claimed in claim 1, wherein the profile of the sensor measured values from at least one sensor element, which is typical of the operator control event, has an associated series of features which are first of all extracted from the sensor measured values and are then classified, in the manner of pattern recognition, for coarse evaluation and/or for fine evaluation.

10. The method as claimed in claim 9, wherein the features are defined by a parameter selected from the width, the height, the edge gradient, the curvature of portions of the sensor pulses, a time offset between two sensor pulses from a sensor element, or a combination thereof.

11. The method as claimed in claim 9, wherein the features are defined as a time offset between the sensor pulses from two sensor elements and/or as a predetermined correlation, for the sensor signals from two sensor elements relative to one another.

12. The method as claimed in claim 1, wherein at least one sensor element is a proximity sensor.

13. The method as claimed in claim 1, for used with a motor vehicle.

14. The method as claimed in claim 2, wherein the control unit comprises a keyless entry control unit.

15. The method as claimed in claim 2, wherein the electrical power supply system comprises the control unit, a bus system, or a combination thereof.

16. The method as claimed in claim 3, wherein the authentication dialog is radio-based.

17. The method as claimed in claim 3, wherein the hatch is opened following detection of a further operator control event by the sensor arrangement.

18. The method as claimed in claim 7, wherein the rear fairing portion comprises a rear bumper.

19. The method as described in claim 11, wherein the predetermined correlation comprises a cross-correlation.

* * * * *